United States Patent [19]

Sato et al.

[11] Patent Number: 4,970,584
[45] Date of Patent: Nov. 13, 1990

[54] METHOD AND APPARATUS FOR THE COMPENSATION OF COLOR DETECTION

[75] Inventors: Yojiro Sato, Omiya; Kaoru Imao, Kawasaki, both of Japan

[73] Assignee: Ricoh Company, Ltd., Tokyo, Japan

[21] Appl. No.: 277,444

[22] Filed: Nov. 29, 1988

Related U.S. Application Data

[63] Continuation of Ser. No. 863,166, May 14, 1986, abandoned.

[30] Foreign Application Priority Data

May 15, 1985 [JP] Japan ................... 60-103198
May 15, 1985 [JP] Japan ................... 60-103199
Jun. 25, 1985 [JP] Japan ................... 60-138106

[51] Int. Cl.⁵ .............................................. H04N 1/46
[52] U.S. Cl. ........................................ 358/75; 358/80
[58] Field of Search ............... 358/75, 75 IJ, 78, 80

[56] References Cited

U.S. PATENT DOCUMENTS

| | | | |
|---|---|---|---|
| 3,612,753 | 10/1971 | Korman | 358/80 |
| 4,037,249 | 7/1977 | Pugsley | 358/80 |
| 4,075,662 | 2/1978 | Gall | 358/80 |
| 4,458,265 | 7/1984 | Yoshida et al. | 358/80 |
| 4,481,532 | 11/1984 | Clark et al. | 358/80 |
| 4,561,016 | 12/1985 | Jung et al. | 358/80 |
| 4,622,582 | 11/1986 | Yamada | 358/80 |
| 4,626,903 | 12/1986 | Giesche et al. | 358/80 |
| 4,679,074 | 7/1987 | Sugiura et al. | 358/80 |
| 4,731,662 | 3/1988 | Udagawa et al. | 358/80 |
| 4,752,822 | 6/1988 | Kawamura | 358/80 |
| 4,833,532 | 5/1989 | Abe | 358/80 |

FOREIGN PATENT DOCUMENTS

| | | | |
|---|---|---|---|
| 0144188 | 6/1985 | European Pat. Off. | 358/80 |
| 54473 | 3/1982 | Japan | 358/75 IJ |
| 57-101840 | 6/1982 | Japan . | |
| 57-131172 | 8/1982 | Japan . | |
| 198463 | 12/1982 | Japan | 358/80 |
| 78348 | 5/1984 | Japan | 358/80 |
| 123392 | 7/1984 | Japan | 358/80 |
| 148278 | 8/1985 | Japan | 358/80 |
| 652578 | 3/1979 | U.S.S.R. | 358/75 |

Primary Examiner—James J. Groody
Assistant Examiner—Mark R. Powell
Attorney, Agent, or Firm—Oblon, Spivak, McClelland, Maier & Neustadt

[57] ABSTRACT

A color document or color video information is inputted to a system which corrects the color of the images scanned or inputted by using data indicative of the conditions under which the color document or color video information was prepared. Color compensation coefficients are used to correct for color distortions that might have occurred in the color document or in the color video information. The color distortions of the input document or those of the color video signal relative to an original are provided as data values of a function of three primary color separation signals, so that color compensation may be performed by an inverse processing of the same data function. This allows for a more accurate and faithful reproduction of the color image.

6 Claims, 12 Drawing Sheets

METHOD AND APPARATUS FOR THE COMPENSATION OF COLOR DETECTION

This application is a continuation of application Ser. No. 863,166 filed on May 14, 1986, now abandoned.

BACKGROUND OF THE INVENTION

The present invention relates to an image processing method applicable to recording of images of a color document or color video signals and, more particularly, to a method and apparatus for compensating for color distortions which are contained in inputted original color document images or color video signals.

When original color images are scanned by a color scanner, for example, there is produced red (R) data, green (G) data and blue (B) data where the signal levels are individually associated with the color components of the images. Theoretically, the original color images may be reproduced by mixing cyan (C) ink, magenta (M) ink and yellow (Y) ink by subtraction using the scanned R, G and B data. In practice, however, a scanning system involves various kinds of distortions such as the distortion caused by the spectral transmission characteristic of a filter which is included in a color scanner for color separation. A recording system also involves distortions such as is caused by the coloring characteristics of ink, the gamma characteristic attributable to the dot printing ability of a printer and the representation of half-tone which relies on a matrix of dots. Distortions may also be due to the use of different kinds of papers. Such distortions are combined together so that, generally, a reproduction does not accurately conform to the subtraction color mixture. For this reason, color compensation processing has customarily been employed.

Prior art color compensating methods are elaborated in regard to a color copier or like color image recording system for example, in Japanese Laid-open Patent Publication (Kokai) Nos. 57-131172 and 57-101840. The problem with those prior art methods is that they simply process colors such that input and output colors correspond on a one to one ratio to each other and therefore the original colors of a document are reproduced with fidelity.

SUMMARY OF THE INVENTION

It is therefore an object of the present invention to provide a color compensating method capable of faithfully estimating and restoring original colors of a document in the event of recording color images of the document or color video signals.

It is another object of the present invention to provide a color compensation processing apparatus capable of performing optimum color compensation at all times.

It is another object of the present invention to provide a generally improved method and apparatus for compensating color images.

In one aspect of the present invention, there is provided a color compensating method for inputting images of a color document to compensate colors of the images, wherein conditions under which the document was prepared and and for operating compensation coefficients for compensating for color distortions of the inputted document images.

In another aspect of the present invention, there is provided a color compensating method for inputting color video information to compensate colors of images, wherein conditions under which the inputted color video information was prepared and compensation coefficients for compensating color distortions of the color video information are generated.

In another aspect of the present invention, there is provided a color compensating method for inputting images of a color document to compensate for colors of the images, wherein color distortions of the document relative to an original are given as functions of three primary color separation signals, the colors being compensated by inverse function processing using the functions.

In another aspect of the present invention, there is provided a color compensating method for inputting a color video signal to compensate colors of images, wherein color distortions of the inputted color video signal relative to an original are given as functions of three primary color separation signals, the colors being compensated by inverse function processing using the functions.

In another aspect of the present invention, there is provided a color image processing apparatus comprising color video information generating device for generating color video information, an inputting section for inputting a selection signal which specifies a particular one of a plurality of groups of color compensation processing functions, a color compensation processing section for generating color recording information by compensating the color video information by the color compensation processing functions which are specified by the selection signal, and a color image recording section for recording color images which are represented by the color recording information.

The above and other objects, features and advantages of the present invention will become more apparent from the following detailed description taken with the accompanying drawings.

DESCRIPTION OF THE PREFERRED EMBODIMENTS

While the method and apparatus for compensating color images of the present invention are susceptible of numerous physical embodiments, depending upon the environment and requirements of use, substantial numbers of the herein shown and described embodiments have been made, tested and used, and all have performed in an eminently satisfactory manner.

A color compensating method in accordance with the present invention will be described in detail.

Generally, the response of a color reproducing system may be expressed as:

$$O = S \cdot \phi i \cdot H \cdot \phi r$$

where $\phi i$ is a color distortion developed in an inputting section, $\phi r$ a color distortion developed in a recording section, H a compensation function, S an inputted color document, and O an outputted picture.

If an equation $H = (\phi i \cdot \phi r)^{-1}$ is fulfilled, then the outputted picture O becomes equal to the inputted document S. Under this condition, not only the intended color compensation but also compensation of all kinds of distortions inherent in a color reproducing system can in principle be achieved to faithfully reproduce colors of original images. The present invention has been derived from this principle.

Figure 1:
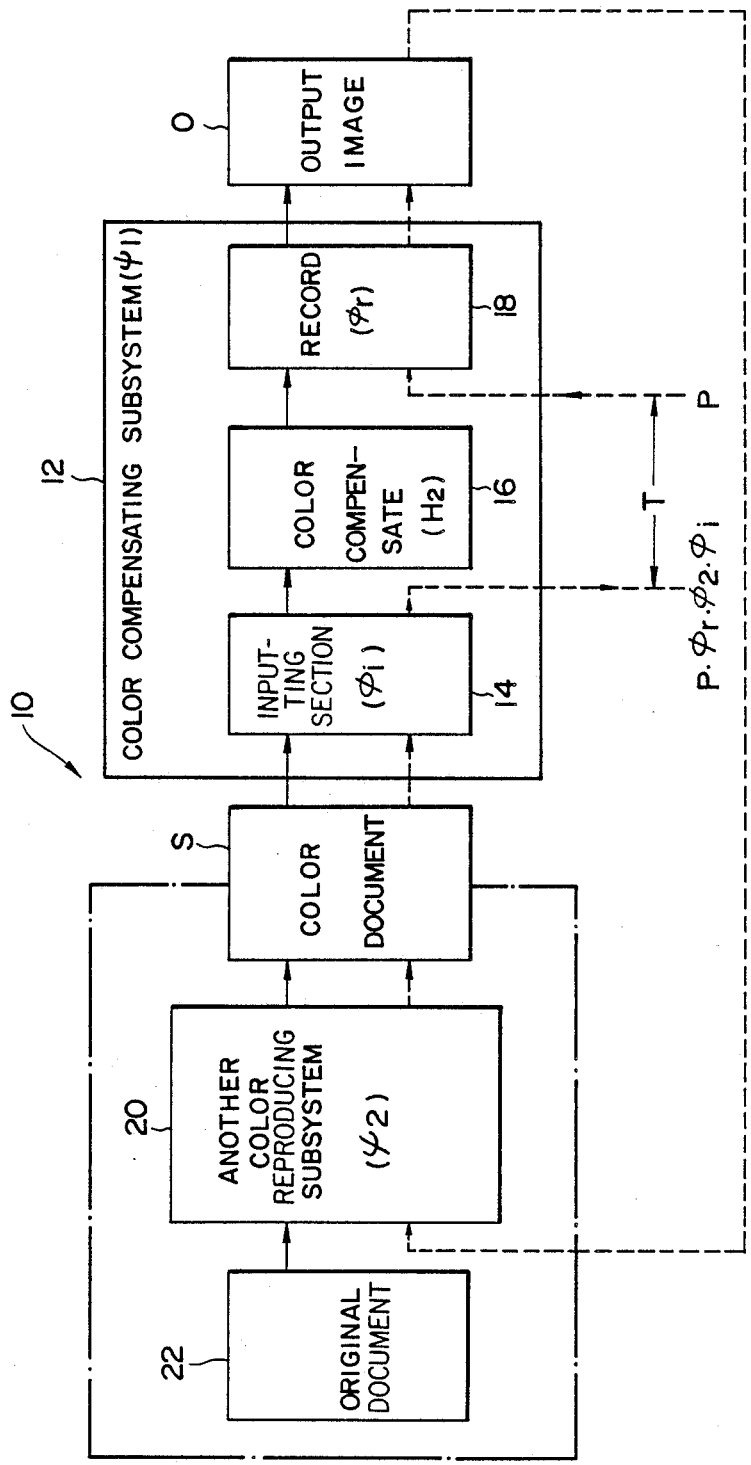
FIG. 1 is a block diagram of a system for practicing a method of the present invention.

Referring to FIG. 1, there is shown an exemplary system for estimating and reproducing colors of original color images. This system, generally 10, includes a color reproducing subsystem 12 which has a color distortion $\phi 1$ and is made up of an inputting section (with a color distortion $\phi i$) 14 to which a color document S is inputted, a color compensating section (with a compensation function H2) 16 for compensating colors of the inputted document S, and a recording section (with a color distortion $\phi r$) for outputting a picture O. The inputted color document S in an output of another color reproducing subsystem 20 which prepares the document S based on an original document, or object, 22. In the drawing, solid arrows are representative of a document reproducing sequence and dotted arrows, a compensating sequence.

Figure 2:
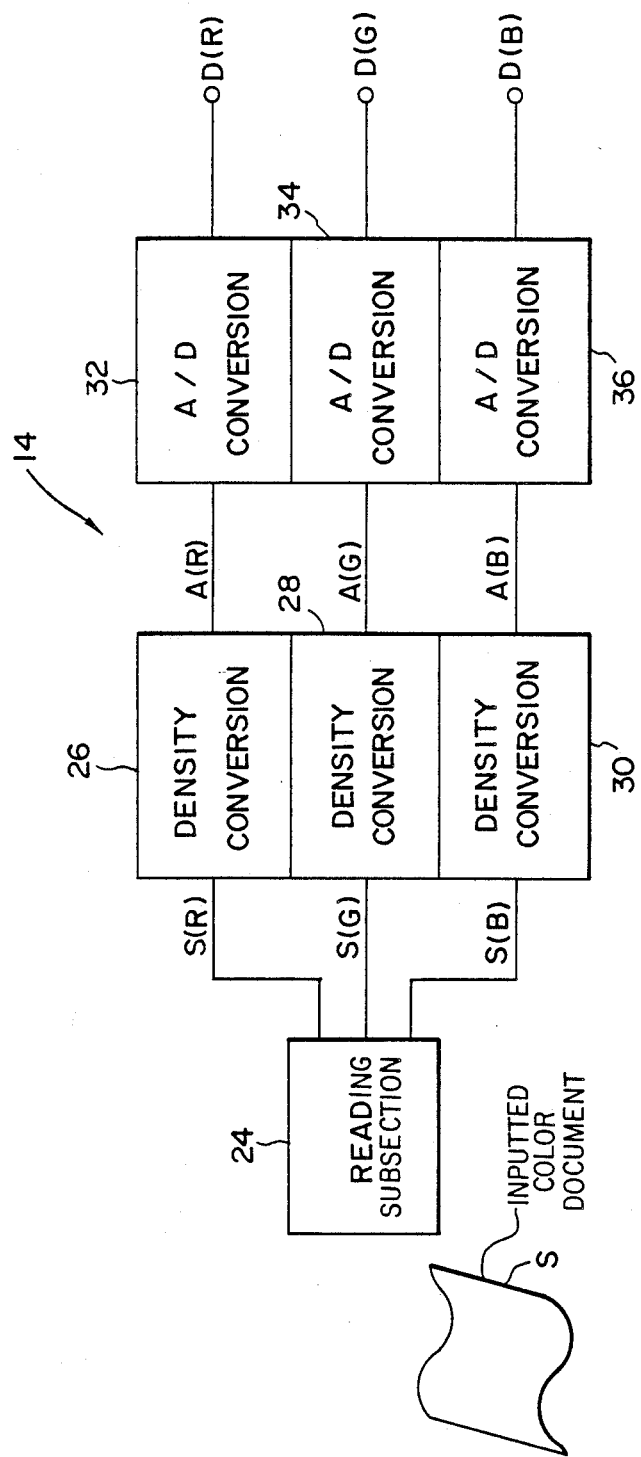
FIG. 2 is a block diagram showing a specific construction of an inputting section which is included in the system of FIG. 1.

Referring to FIG. 2, a specific construction of the inputting section 14 is shown. As shown, the section 14 comprises a reading subsection 24 for reading the inputted color document S by separating it into color components R, G and B, density converting subsections 26, 28 and 30 adapted to convert respectively signals S(R), S(G) and S(B) representative of the color components to signals A(R), A(G) and A(B) which are associated with particular densities of the color components, and analog-to-digital (AD) converting subsections 32, 34 and 36 adapted to convert respectively analog outputs of the subsections 26, 28 and 30 to digital signals D(R), D(G) and D(B). The inputted color document S may be a photograph or a printed matter (inclusive of a hard copy) by way of example. The reading subsection 24 may be implemented with a scanner or a television (TV) camera.

Figure 3:
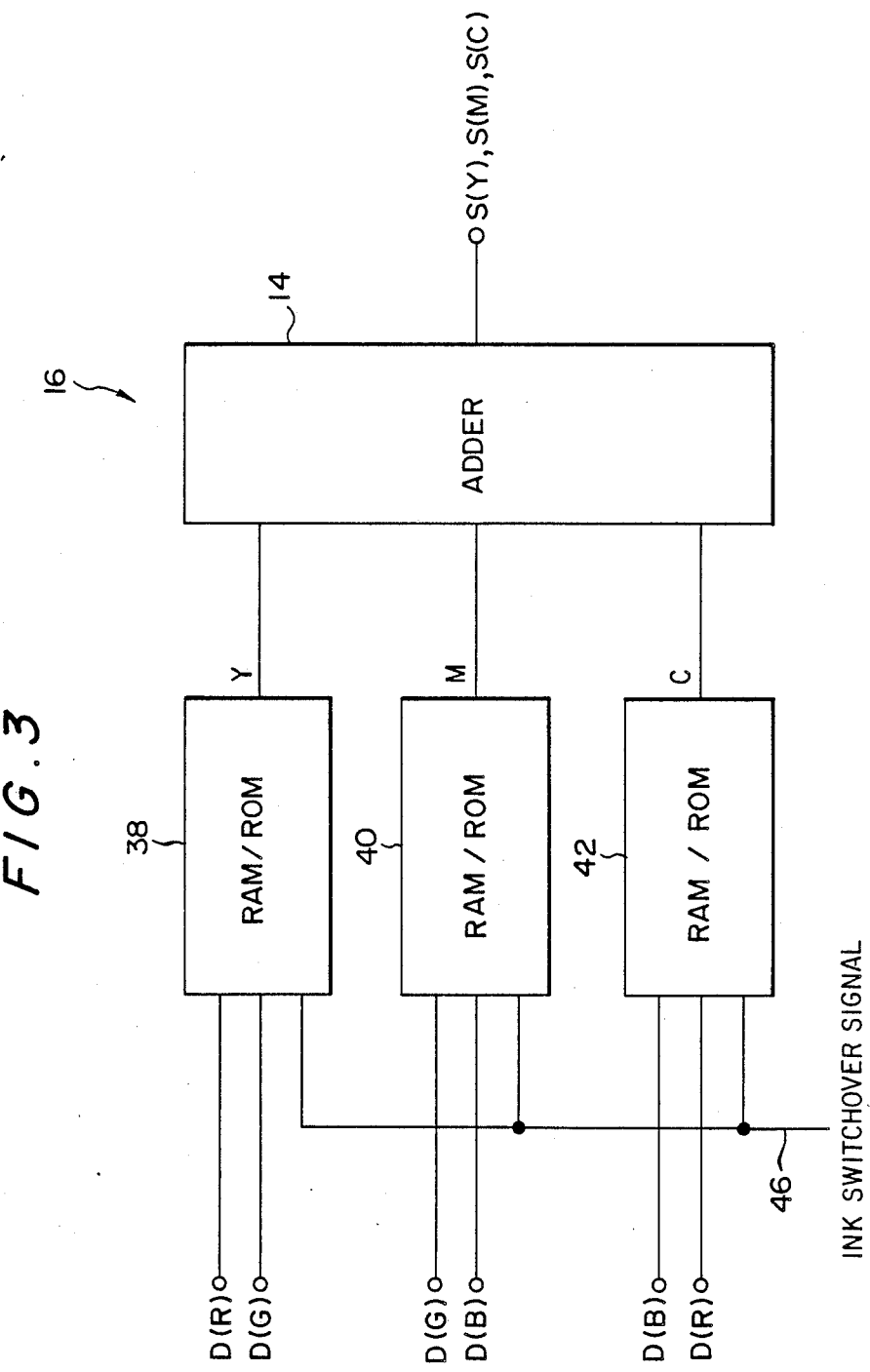
FIG. 3 is a block diagram showing a specific construction of a color compensating section of the system of FIG. 1.

Referring to FIG. 3, a specific construction of the color compensating subsystem 16 is shown. As shown, the subsystem 16 comprises random access memories (RAMs)/read only memories (ROMs) 38, 40 and 42 from each of which particular color conversion data, i.e., Y, M or C stored therein is read out depending upon the combination of digital signals D(R), D(G) and D(B), which are outputted by the inputting section 14, and an adder 44 for adding the conversion data read out to produce signals S(Y), S(M) and S(C) representative of respective color components Y, M and C. An ink switchover signal 46 is applied to the ROM/RAMs 38, 40 and 42 so that conversion data associated with the respective colors Y, M and C are sequentially read out.

Figure 4:
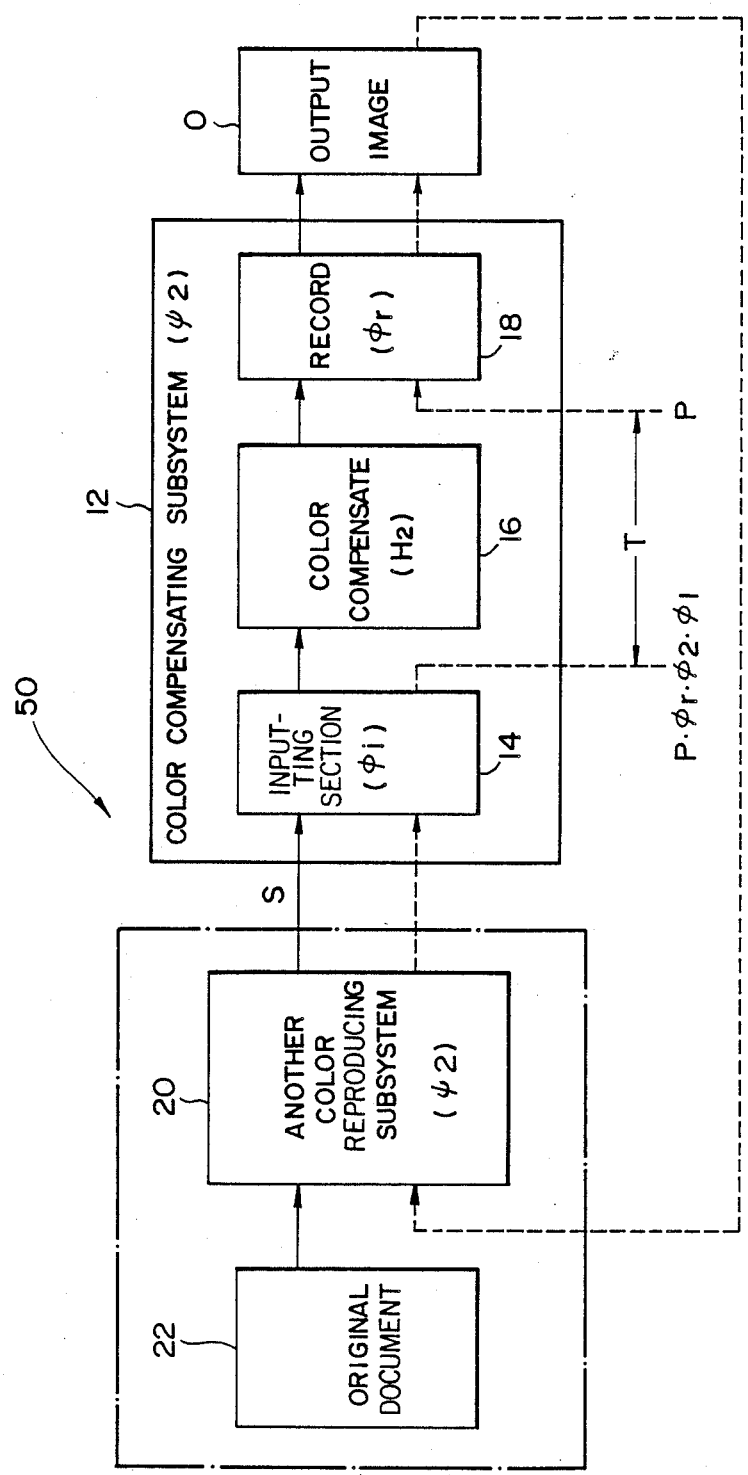
FIG. 4 is a block diagram of another system for practicing the method of the present invention.

Referring to FIG. 4, another specific construction of the subsystem adapted to estimate and reproduce original colors of a color picture is shown. In this particular system 50, it is a color video signal S that is applied to the inputting section 14. The signal S is an output of another color reproducing subsystem 20 which produces a color video signal based on the original document 22.

Figure 5:
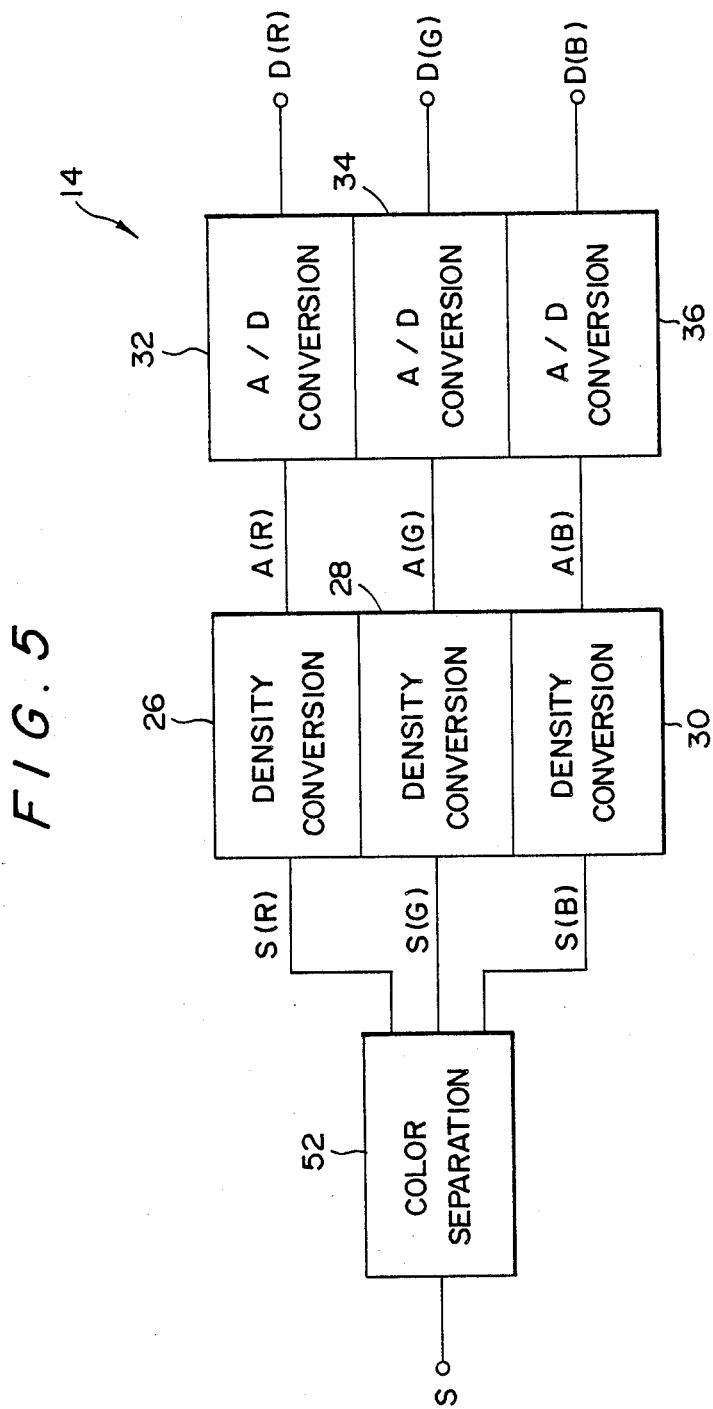
FIG. 5 is a block diagram showing a specific construction of an inputting section included in the system of FIG. 4.

FIG. 5 shows a specific construction of the inputting section 14 of FIG. 4. In this illustrative construction, the video signal S is applied to a color separating subsection 52 which then produces signals S(R), S(G) and S(B) representative of colors R, G and B, respectively. Where the signal S is a TV signal, an NTSC (National Television Systems Committee) signal is separated by a demodulator into color component signals S(R), S(G) and S(B).

A specific example of color compensation which the subsystem 16 performs is as follows. Color component signals S(Y), S(M) and S(C) free from color distortions are produced according to color component signals D(R), D(G) and D(B) by adopting compensation coefficients $a$:

$$S(Y) = a_{10} + a_{11}D(R) + a_{12}D(G) + a_{13}D(B) +$$
$$a_{14}D(R)^2 + A_{15}D(G)^2 + a_{16}D(B)^2 + \ldots$$
$$S(M) = a_{20} + a_{21}D(R) + a_{22}D(G) + a_{23}D(B) +$$
$$a_{24}D(R)^2 + a_{25}D(G)^2 + a_{26}D(B)^2 + \ldots$$
$$S(C) = a_{30} + a_{31}D(R) + a_{32}D(G) + a_{33}D(B) +$$
$$a_{34}D(R)^2 + a_{35}D(G)^2 + a_{36}D(B)^2 + \ldots$$

Heretofore, the coefficients have been selected in such a manner as to compensate colors in consideration of the fidelity of a reproduced picture O to an inputted color document or a color video signal S. Also, where an input system deals with a TV signal or the like having a different gamma characteristic or where the density range differs from an inputted document to a print output, it has been customary to perform gamma conversion or density compression before color compensation. In most cases, however, it is desirable to choose fidelity of the reproduced picture O to the original document 22 rather than fidelity to the color video signal S. The reason is that since color distortions in the color reproducing subsystem 20 adapted to generate a color document or a color video signal based on the original document 22 are directly introduced in the inputted color document or the video signal S, fidelity of colors have already been lost in the inputted color document or the video signal S.

Thus, in accordance with the present invention, color compensation is effected such that fidelity of the reproduced picture O to the original document 22 is estimated and restored in consideration of color distortions in the subsystem 20 as well.

Specifically, let a distortion in the color reproducing subsystem 20 which has prepared an input color document S be $\phi'$ and a color compensation function $H_2$ a polynomial including linear or non-linear terms of R, G and B which are input variables. A digital color patch (P) made up of 512 different colors is prepared. A reproduction (P·$\phi$r) of the patch (P) is fed to the inputting section 14 via the subsystem 20 to calculate P·$\phi$r·$\phi'_2$·$\phi$i which can be turned into data. Then, compensation coefficients are calculated for respective terms of the function $H_2$ by the minimum square method such that (P·$\phi$r·$\phi'_2$·$\phi$i)·$H_2$=P holds, thereby estimating the function $H_2$ with maximum likelihood. In FIG. 1, T represents the maximum likelihood estimation process performed on $H_2$. In this case, the distortion $\phi''_2$ in the color reproducing subsystem which has produced the input color document S and that $\phi'_2$ in the subsystem which has estimated the function $H_2$ with maximum likelihood are generally not equal to each other. Nevertheless, by estimating $\phi'_2 = \phi''_2 = \phi_2$, it is possible to estimate and restore the original colors (S·$\phi_2^{-1}$) of the inputted color document because the response of the subsystem 12 which involves distortion $\phi_1$ is:

$$O = S \cdot \phi i \cdot H_2 \cdot \phi r$$
$$= S \cdot \phi i \cdot (\phi r \cdot \phi_2 \cdot \phi i)^{-1} \cdot \phi r$$
$$= S \cdot \phi_2^{-1}$$

In this manner, the amount of distortions contained in an input color document or a color video sinal S can be removed by producing a distortion compensation function for the input document or the video signal and, then, compensating the scanned or inputted colors by way of the inverse function processing using the derived function.

Further, in accordance with the present invention, in the event of estimating distortions of an input color document or that of a color video signal S, the colors of an original color document (S·$\phi_2$ (j)$^{31\ 1}$) are estimated and reproduced in consideration of conditions j under which the document or the video signal was prepared and by setting up an equation:

$$O = S \cdot \phi i \cdot H_2 \phi r$$
$$= S \cdot \phi i \cdot \{\phi r \cdot \phi_2(j) \cdot \phi i\}^{-1} \cdot \phi r$$
$$= S \cdot \phi_2(j)^{-1}$$

Here, $\phi_2(j)$ is representative of a distortion under the certain conditions j for preparing an input color document or a color video signal.

In that instance, models of the conditions j are set up. For example, where the color document is a photograph, the kinds of illumination (daylight, fluorescent lamp, sunlight, etc.), the kinds of films (35 millimeters negative, positive, Polaroid, etc.) and the kinds of development are individually classified and used as distortion models. Where the color document is a printed matter, the kinds of printing (halftone, gravure, etc.), the kinds of papers (fine quality, plain, etc) and the kinds of recording systems (printing, ink jet recording, thermal recording, etc.) are individually classified and used as distortion models.

The compensation coefficients based on various variable conditions which conform to the classified distortion models are determined. In the construction shown in FIGS. 1 or 2, such coefficients are produced by feeding a document produced in the reproducing section and the compensating section in a manner as indicated by the dotted line.

When a color document or a color video signal is to be entered, the above various conditions are initially loaded in the system so that compensation data associated one-to-one with the loaded conditions are registered. This allows the color document or the color video signal to be compensated so as to estimate and reproduce an original document.

As described above, in accordance with the present invention, upon entry of a color document or color video information, original colors can be estimated and reproduced by performing color compensation taking into account the color distortions in an inputting system. Further, if the conditions under which the color document or the color video information was produced are classified to prepare distortion models, coefficients for color compensation can be automatically selected freeing a person from manual color matching. In addition, where color documents have different densities, the coefficients are switchable from one to another to automatically and optimumly compensate colors eliminating the need for density compression or a signal-by-signal gamma characteristic matching.

Hereinafter, a preferred embodiment of a color compensating apparatus of the present invention will be described in detail.

Figure 6:
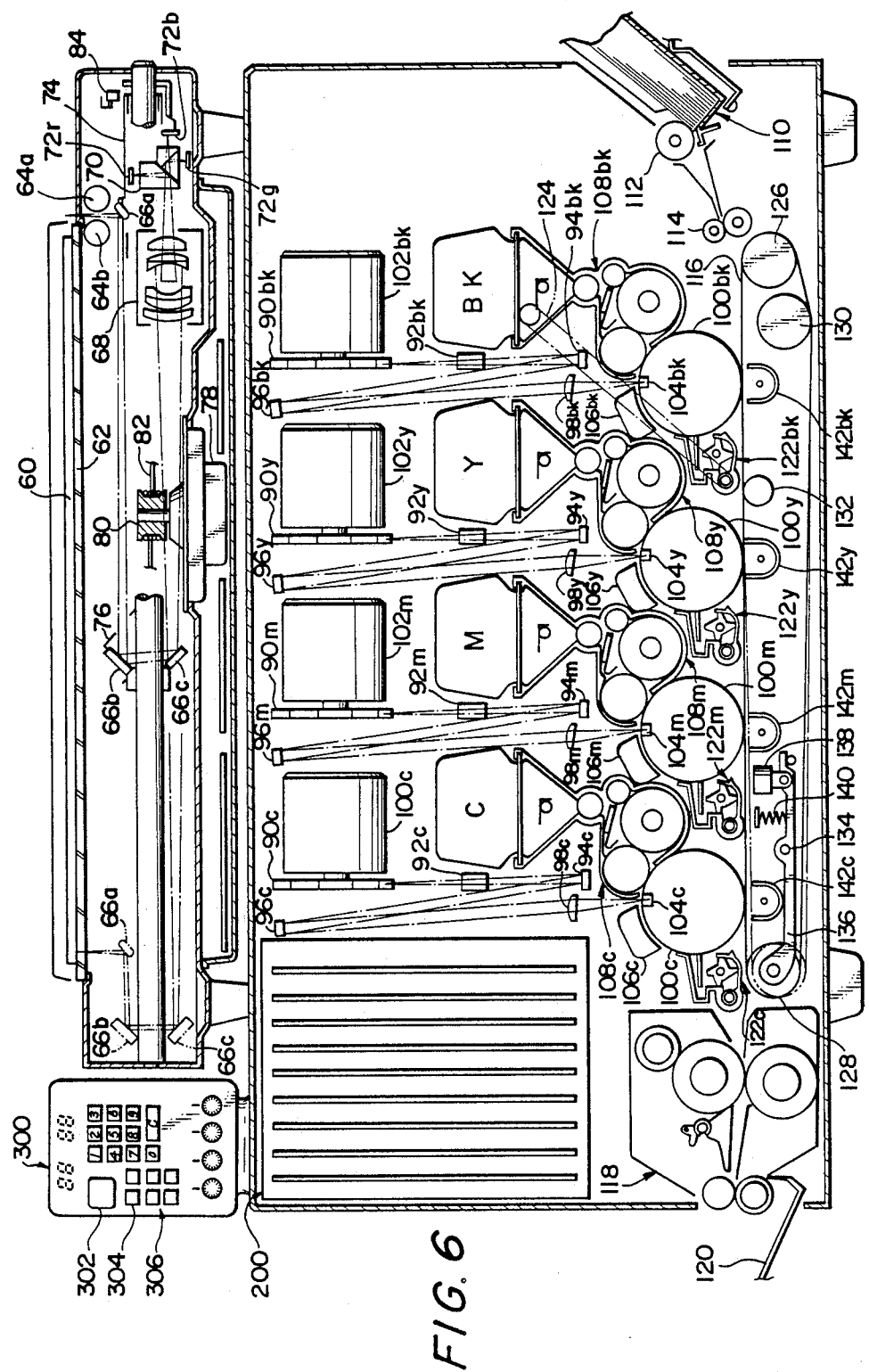
FIG. 6 is a section showing an essential mechanical arrangement of a digital color copier to which the present invention is applicable.

Referring to FIG. 6, a mechanical arrangement of a digital color copier to which the apparatus of the present invention is applied is shown. An electrical arrangement of the copier is shown in FIG. 7.

As shown in FIG. 6, an original document 60 is laid on a glass platen 62 and illuminated by fluorescent lamps 64a and 64b. Reflections from the document 60 are sequentially reflected by a first mirror 66a, a second mirror 66b and a third mirror 66c which are movable and, then, incident to a dichroic prism 70 via a lens 68. The prism 70 separates the incident light into three components having different wavelengths, i.e., red (R), green (G) and blue (B). The red light is directed toward a charge coupled device (CCD) 72r, the green light to a CCD 72g, and the blue light to a CCD 72b. The lamps 64a and 64b and the first mirror 66a are mounted on a first carriage 74, and the second and third mirrors 66b and 66c on a second carriage 76. The second carriage 76 is moved at a speed which is one half the speed of the first 74, thereby maintaining the optical path between the document 60 and the CCDs constant in length. To read the document 60, the first and second carriages 74 and 76 are each driven from the right to the left. The first carriage 74 is connected to a carriage drive wire 82 which is passed over a carriage drive pulley 80 which is in turn rigidly mounted on a shaft of a carriage drive motor 78. A wire 82 is wrapped around a movable pulley (not shown) which is mounted on the second carriage 76. In this construction, as the motor 78 is driven either forwardly or reversely, the first and second carriages 74 and 76 are moved forwardly (document read) or reversely (return).

Figure 8:
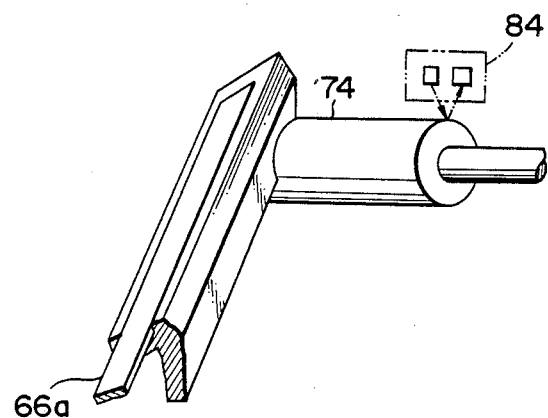
FIG. 8 is an enlarged perspective view of a part of a first carriage which is shown in FIG. 6.

When the carriage 74 is in a home position thereof as shown in FIG. 6, a home position sensor 84 which is a reflection type photosensor senses the carriage 74. The relationship between the carriage 74 and the sensor 84 is shown in detail in FIG. 8. As the carriage 74 is driven to the right away from the home position in order to scan the document, light incident to the sensor 84 is intercepted so that the sensor 84 produces a non-detection output. As soon as the carriage 74 is returned to the home position, the light is again incident to the sensor 84 which then produces a detection output. Upon the change of the sensor output from non-detection to detection, the movement of the carriage 74 is stopped.

Figure 7:
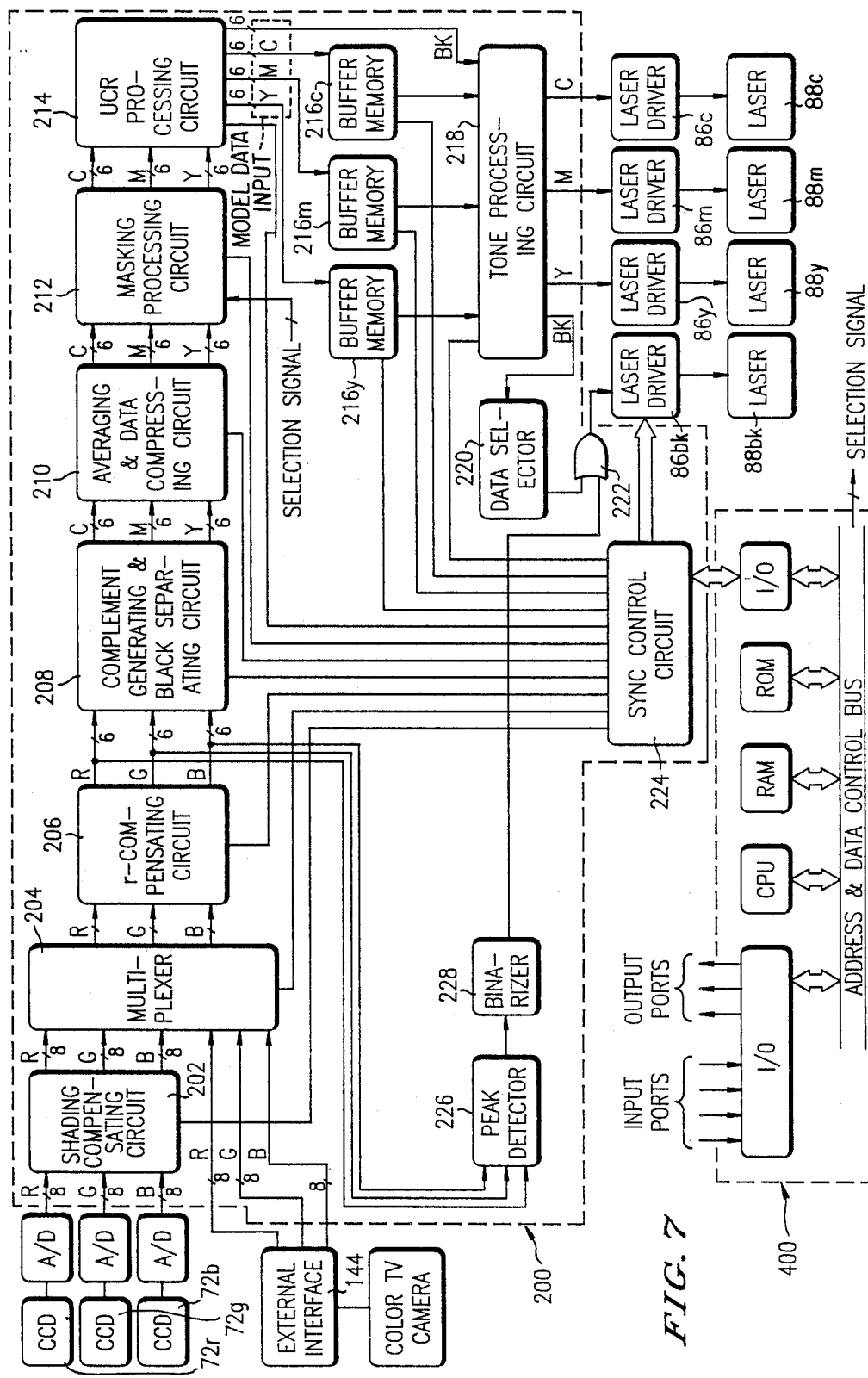
FIG. 7 is a block diagram of an essential electrical arrangement of the copier.

Referring to FIG. 7, the outputs of the CCDs 72r, 72g and 72b are each subjected to analog-to-digital conversion and, then, to necessary processing at an image processing unit 200 to be thereby converted to two-level color video signals, i.e. black (BK), yellow (Y), magenta (M) and cyan (C). The two-level signals are respectively applied to laser drivers 86bk, 86y, 86m and 86c which in turn drive their associated semiconductor lasers 88bk, 88y, 88m and 88c. As a result, each of the lasers 88bk to 88c emits a laser beam which has been modulated by the associated color video information.

Referring again to FIG. 6, the laser beams are respectively reflected by rotary polygon mirrors 90bk, 90y, 90m and 90c, then transmitted through F-theta lenses 92bk, 92y, 92m and 92c, then reflected by fourth mirrors 94bk, 94y, 94m and 94c and fifth mirrors 96bk, 96y, 96m and 96c, then transmitted through cylindrical lenses 98bk, 98y, 98m and 98c, and then focused on a photoconductive drums 100bk, 100y, 100m and 100c. The polygon mirrors 90bk to 90c are rigidly mounted on output shafts of motors 102bk, 102y, 102m and 102c, respectively. The motors 102bk to 102c drive their associated mirrors at a predetermined speed. While the mirrors 90bk to 90c are rotated, the respective laser beams scan their associated drums 100bk to 100c along the axes of the latter, i.e. perpendicularly to the direction of rotation of the drums (clockwise).

Figure 9:
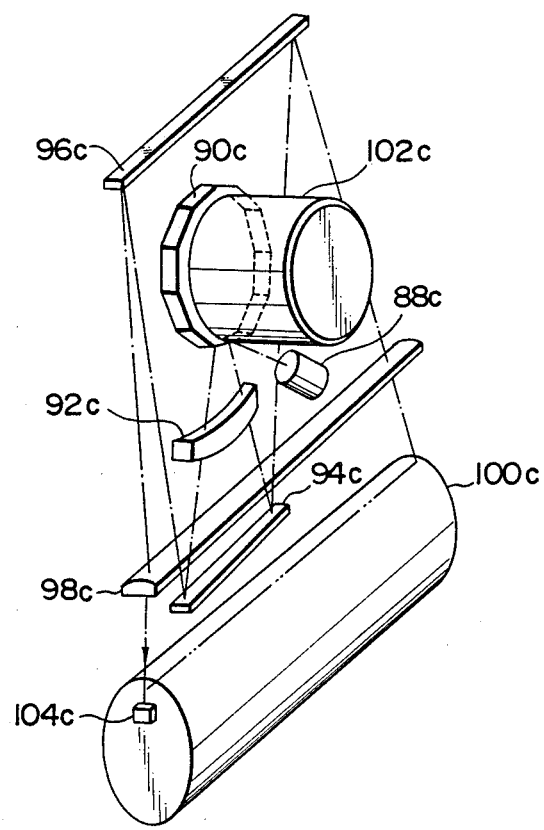
FIG. 9 is an exploded perspective view of a cyan recording device which is also shown in FIG. 6.

Referring to FIG. 9, a laser scanning system associated with a cyan recording device is shown in detail. Designated by the reference numeral 88c is the semiconductor laser. A sensor 104c which comprises a photoelectric transducer is located such that it receives the laser beam at one end of laser scanning (dash-and-dots line) which occurs along the axis of the drum 100c. A change of the output of the sensor 104c from detection to non-detection is repesentative of the point of start of one line scanning. That is, a detection output (pulse) of the sensor 104c is processed as a line sync pulse. Although not shown in the drawings, a magenta recording device, a yellow recording device and black recording device are each constructed in exactly the same manner as the cyan recording device of FIG. 9.

Turning back to FIG. 6, the surfaces of the drums 100bk to 100c are respectively uniformly charged by chargers 106bk, 106y, 106m and 106c which are commonly connected to a negative high voltage generator, not shown. As any of the laser beams which has been acoustooptically modulated is incident to its associated drum 100, the charge on the drum surface is dissipated to ground by photoconduction. In this instance, the laser is turned off when the portion of the document being scanned contains no image and turned on when it contains any image. As a result, those portions of each of the drums 100bk to 100c which correspond to image-carrying portions of the document are provided with a potential of about −800 volts and those which correspond to non-image-carrying portions to a potential of about −100 volts, whereby latent images are formed electrostatically on the drum in correspondence with document images. The latent images are respectively developed by a black developing unit 108bk, a yellow developing unit 108y, a magenta developing unit 108m and a cyan developing unit 108c to appear on the surfaces of the drums 100bk to 100c as black, yellow, magenta and cyan toner images. Meanwhile, toner in each of the developing units is positively charged by motion of the toner in that, the developing units are biased to about −200 volts by a developing bias generator, not shown. The toner images corresponding to the document images are formed in those portions of the drum where the surface potential is higher than the bias voltage.

Papers are stacked in a sheet cassette 110 and fed one by one by feed rollers 114 toward a pair of registration rollers 114. The roller pair 114 advances the paper onto a transfer belt 116 at a predetermined timing. As the transfer belt 116 is moved, it sequentially transports the paper laid thereon along path below the drums 100bk to 100c. While the paper is moved so by the belt 116, the black, yellow, magenta and cyan toner images are sequentially transferred to the paper by coronas 142H, 142Y, 142m, and 142c; which are located below the belt 116. Thereafter, the paper is fed to a thermal fixing unit 118 to have the toner fixed thereon and, then, routed to a tray 120.

Those parts of the toner which remains on the drums after the image transfer are removed by cleaning units 122bk, 122y, 122m and 122c. The cleaning unit 122bk, adapted to collect black toner, is connected to the developing unit 108bk by a conduit 124, thereby collecting the black toner which has been gathered by the unit 122bk. Meanwhile, yellow toner, magenta toner and cyan toner are not collected for reuse because the drums 100y, 100m and 100c are apt to gather the toner particles which have been once transferred to the paper by the preceding developing units, i.e. black, yellow, and magenta toner particles.

The transfer belt 116 adapted to feed the paper as described above is passed over an idle roller 126, a drive roller 128, an idle roller 130 and an idle roller 132 and is rotated counterclockwise by the drive roller 128. The drive roller 128 is pivotally connected to the left end of a lever 136 which is in turn pivotally connected to a shaft 134. Pivotally connected to the right end of the lever 136 is a plunger 138 of a solenoid adapted to set up a black mode, not shown. A coiled compression spring 140 is loaded between the plunger 138 and the shaft 134 constantly biasing the lever 136 clockwise.

While the black mode setting solenoid is deenergized (color mode), the belt 116 is held in contact with all the drums 100bk to 100c, as shown in FIG. 6. In this condition, as a paper is laid on the belt 116 and toner images are formed on all the drums, the toner images are sequentially transferred to the paper which is being moved by the belt 116 (color mode). When the solenoid is energized (black mode), the lever 136 is rotated counterclockwise against the action of the spring 140 with the result that the drive roller 128 is lowered by 5 millimeters. This causes the belt 116 to become clear of the drums 100y, 100m and 100c while remaining in contact with the drum 100bk. In this condition, the paper on the belt 116 makes contact with the drum 100bk only and, hence, only black toner images are transferred to the paper (black mode). Since the paper does not make contact with the drums 100y, 100m and 100c, a copy is produced as in an ordinary monochromatic copier without omission of images otherwise caused by the contact of the paper with the drums 100y, 100m and 100c.

A console board 300 includes a copy start switch 302, a color/black mode switch 304, the key switches 306 for selecting a particular kind of input, a character display, display lamps, etc. The switch 304 is an alternate switch which repeatedly turns on to indicate the black mode and turns off to indicate the color mode; immediately after a power switch has been turned on, it unconditionally turns off to indicate the color mode.

Figure 10:
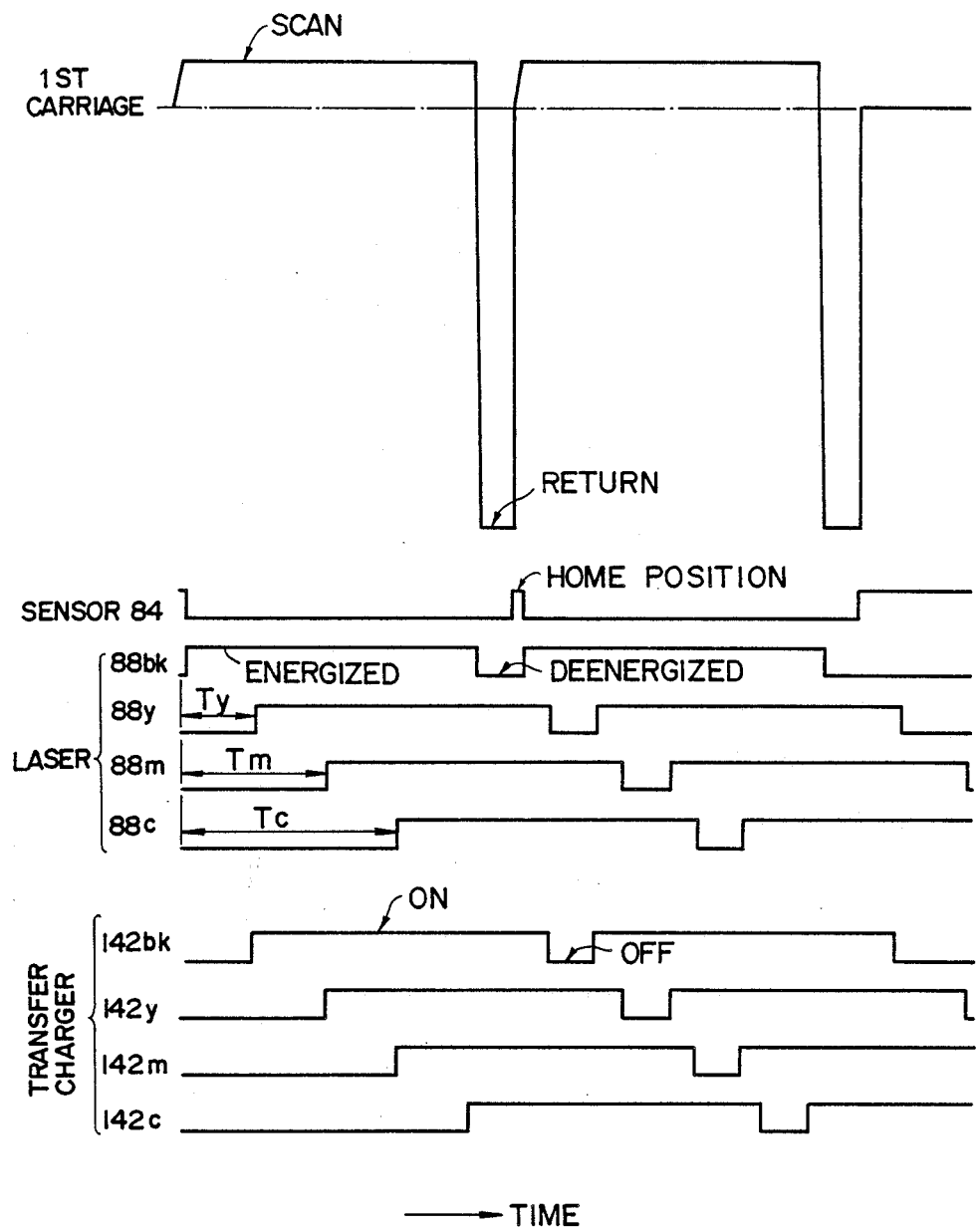
FIG. 10 is a timing chart representative of a relationship between a document scanning timing and a record energizing and a transfer energizing timings.

The operation of the essential part of the copier will be outlined with reference also made to FIG. 10. The timing chart of FIG. 10 is representative of a case wherein two identical, full-color copies are sequentially produced. Substantially timed to the start of a scanning stroke of the first carriage 74, the laser 88bk begins to be modulated by a recording signal. The other lasers 88y, 88m and 88c begin to be modulated one after another upon the lapse of times Ty, Tm and Tc which correspond respectively to the distances between the drum 100bk and the drums 100y, 100m and 100c. The coronas 142bk, 142y, 142m and 142c are each energized a predetermined time later than the start of modulation of the associated laser 88bk, 88y, 88m or 88c (i.e. a time necessary for the point of the drum being scanned to reach the corotron)

Referring again to FIG. 7, the image processing unit 200 functions to convert three-color video signals that are read by the CCDs 72r, 72g and 72b to black (BK), yellow (Y), magenta (M) and cyan (C) recording signals. While the BK signal is directly applied to the laser driver 86bk, the Y, M and C signals are applied to their associated laser drivers 86y, 86m and 86c after storing color tone data from which the respective signals are derived in buffer memories 216y, 216m and 216c and, then, reading them out upon the lapse of delay times Ty, Tm and Tc as shown in FIG. 10 and converting them to recording signals. While in a copy mode the image processing unit 200 is supplied with three-color signals from the CCDs 72r, 72g and 72b as stated above, in a graphics mode it is supplied with three-color, i.e., R, G and B signals from a color TV receiver, a color video tape recorder, a color TV camera or the like via an external interface circuit 144.

A shading compensation circuit 202 included in the unit 200 serves to compensate color tone data which have been produced by converting the analog output signals of the CCDs 72r, 72g and 72b to eight-bits digital signals, with respect to irregular luminance distribution, scattering of sensitivity among the internal elements of the CCDs 72r, 72g and 72b, and others. A multiplexer 204 selectively produces the tone data outputted by the shading compensation circuit 202 and the tone data outputted by the interface circuit 144. A γ-compensation circuit 206 to which an output (color tone data) of the multiplexer 204 is applied plays the role of changing the tone (input tone data) in conformity to a particular characteristic of the photoconductive elements and, also, allows a button on the console 300 to be manipulated for the purpose of changing the tone as desired. Further, the circuit 206 changes the input eight-bits data to six-bits data. Since each of the outputs of the circuit 206 has six bits, it is representative of one of sixty-four different tones. The three kinds of six-bits tone data outputted by the circuit 206 and representative of particular tones of red (R), green (G) and blue (B) are routed to a complement generating and black separating circuit 208.

Figure 11:
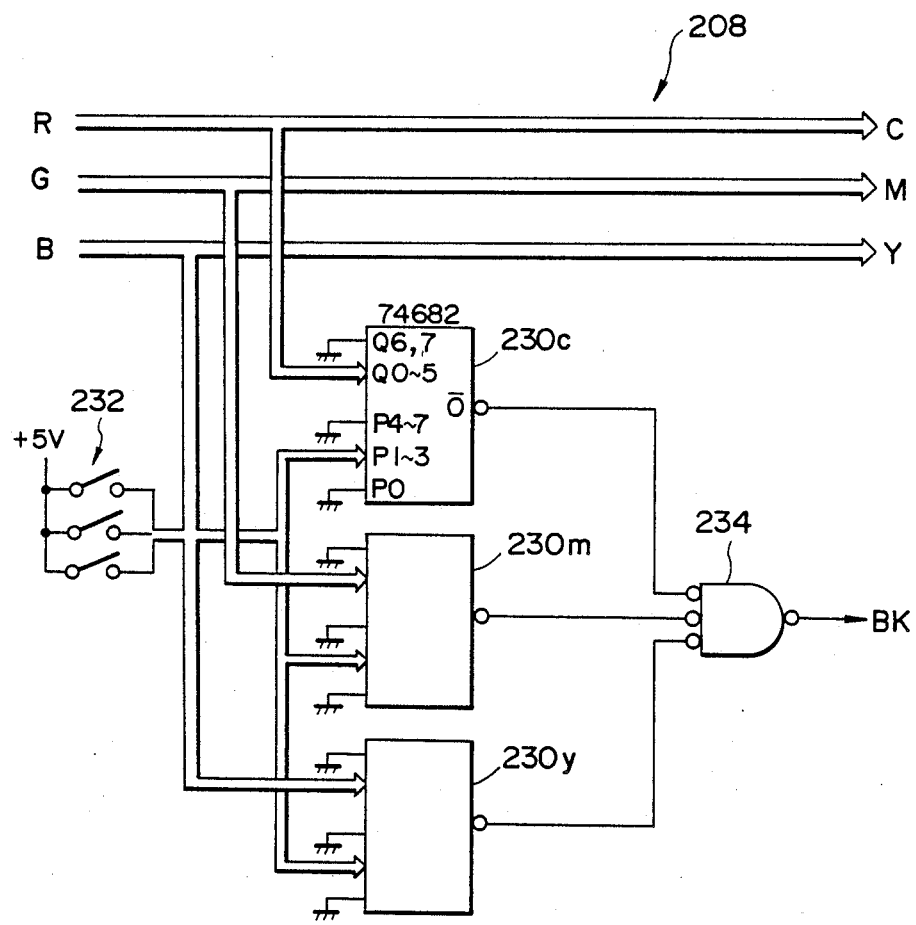
FIG. 11 is a block diagram of a complement generating and black separating circuit which is shown in FIG. 7.

Details of the circuit 208 are shown in FIG. 11. As previously stated, the color copier of the type shown and described uses a negative-to-positive developing method. Hence, generation of complement colors mentioned herein implies converting the respective signals read to their associated recording color signals. Specifically, the red (R) tone data is converted to cyan (C) tone data, the green (G) tone data to magenta (M) tone data, and the blue (B) tone data to yellow (Y) tone data. The C, M and Y tone data are directly fed to an averaging and data compressing circuit 210.

Concerning black separation, on the other hand, if all the tone data are repesentative of high density, recording needs only to be made in black. Then, the R (=C), G (=M) and B (=Y) tone data are respectively applied to digital comparators 230c, 230m and 230y to be compared with reference data, which is selected by a switch 232. Each of the digital comparators 230c, 230m and 230y is an eight-bits comparator while each tone data consists of six bits and, hence, the upper two bits of each comparator are made ZEROs. The switch 232 is capable of selectively changing the first to the third bits of the reference value to ONEs; the zero-th bit and the fourth to seventh bits of the reference data are ZEROs. Stated another way, the reference data is variable within a range of substantially one-fourth of all the tones as counted from the one with the highest density. When the tone data applied to any of the comparators 230c, 230m and 230y is lower than the reference data, the output of the comparator becomes a ZERO; when the former is higher than the latter, the comparator output becomes a ONE. The outputs of all the comparators 230c, 230m and 230y are applied to a negative-logic NAND gate (OR gate) 234. The gate 234 whose output is a ZERO (black) when the outputs of all the comparators are ZEROs and a ONE when any of them is a ONE is connected to a data selector 220.

Figure 12:
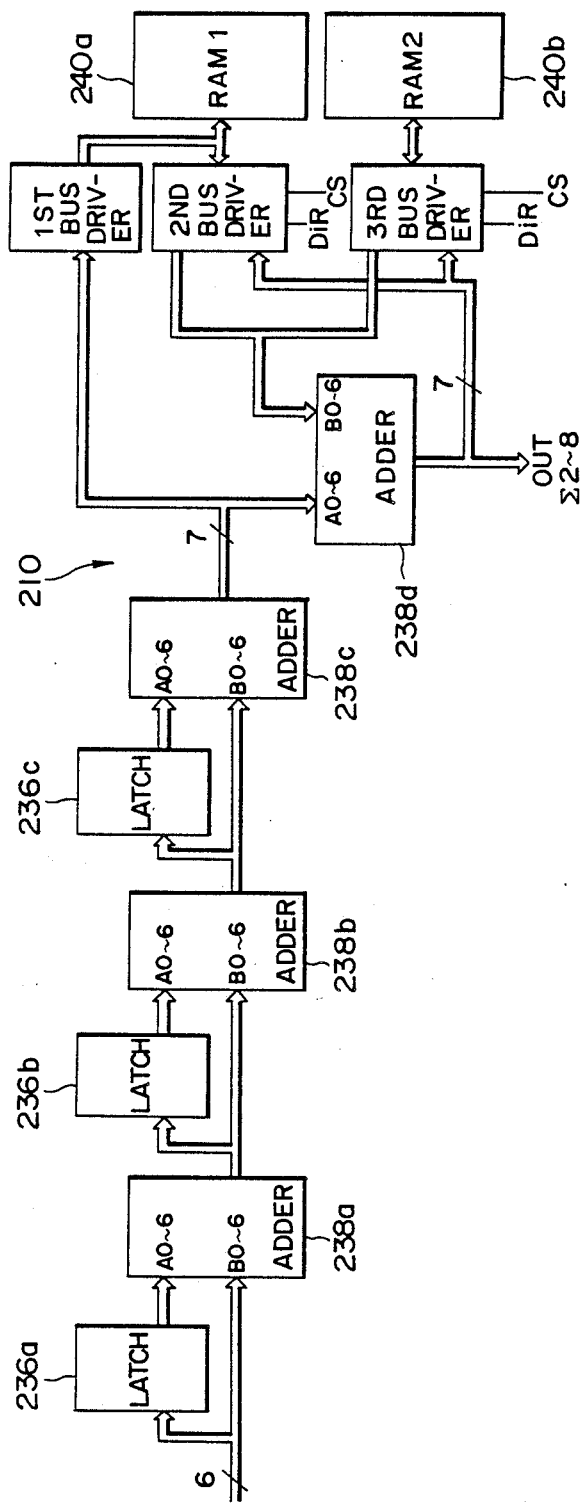
FIG. 12 is a block diagram of an averaging and data compression circuit which is also shown in FIG. 7.
Figure 13:
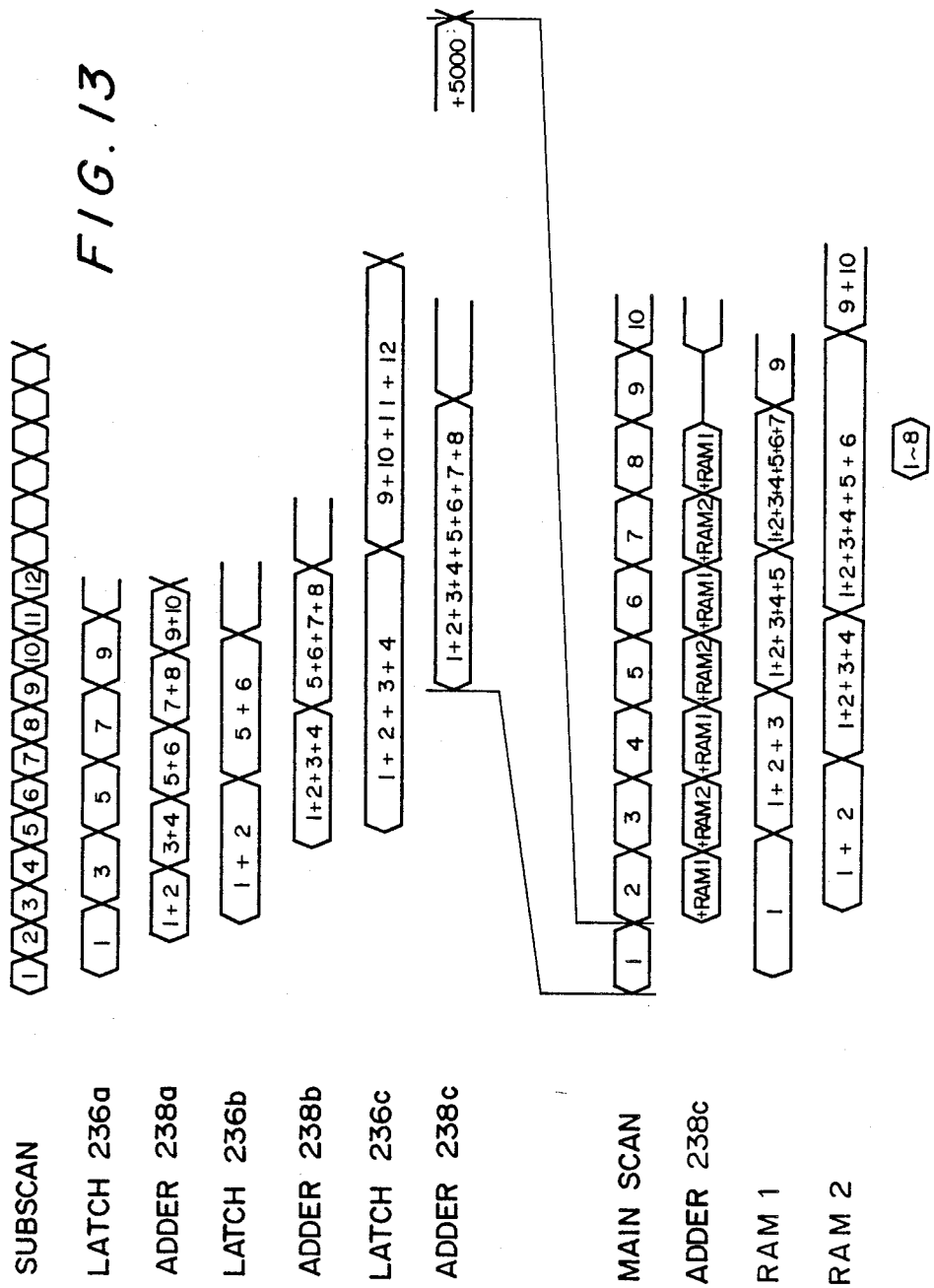
FIG. 13 is a timing chart representative of a data processing sequence which is performed by the circuit of FIG. 12.

Referring to FIG. 12, a specific construction of the averaging and data compressing circuit 210 is shown. The operation timing of the circuit 210 is shown in FIG. 13. The circuit 210 is designed to average a matrix of sixty-four pixels in total, i.e., eight pixels in a subscan direction (scanning direction of the first carriage 74)×eight pixels in a main scan direction (direction perpendicular to the scanning direction; direction for scanning electronic circuits of the CCDs). In the event of averaging sixty-four six-bits data, while adding all the data and dividing the sum by sixty-four has to be implemented with a twelve-bits adder, in this particular embodiment sequential averaging is effected by, for example to use an eight-bits adder.

Addition of eight pixels in the subscan direction will be described first. The first data is latched in a first latch 236a and added to the second data by a first adder 238a, the sum being latched in a second latch 236b. The third data is latched in the first latch 236a and added to the fourth data by the first adder 238 and further added to the data in the second latch 236b by a second adder 238b, the sum of the data on the four pixels (tone data) being delivered from the second adder 238b to be latched by a third latch 236c. As the fifth to eighth data are added and the sum is outputted by the second adder 238b, it is added to the data in the latch 236c by a third adder 238c. In this manner, data on each eight bits in the subscan direction are produced. The output of the first adder 238a is treated as seven-bits data due to addition of six-bits data. Concerning the outputs of the second and third adders 238b and 238c, while the results of processing at the adders 238b and 238c are eight-bits, the upper seven bits thereof are produced as the outputs to essentially halve the summation data.

Next, as regards summation in the main scanning direction, one main scanning line of mean values each being associated with eight pixels and outputted by the third adder 238c are stored in a first random access memory (RAM 1) 240a. As data representative of the second line are outputted by the adder 238c, they are added to the data stored in the RAM 240a by a fourth adder 238d with the resultant sum stored in a second random access memory (RAM 2) 240b. When data on the third line are produced from the adder 238c, they are added to the content of the RAM 240a by the adder 238d and the sum is stored in the RAM 240b. As data on the third line is outputted by the adder 238c, they are added to the content of the RAM 240b by the adder 238d and the sum is stored in the RAM 240a. In this manner, summation outputs are alternately written into and read out of the first and second RAMs 240a and 240b. As data on the eighth line are produced from the adder 238c, they are added to the content of the RAM 240a by the adder 238d. This completes summation of the data on the eight consecutive lines. The fourth adder 238d, like the second and third adders 238b and 238c, outputs only the upper seven bits of the result of seven-bits data addition, thereby producing averaged ($\frac{1}{8}$) data. In this particular embodiment, two four-bits binary full adder (74283) are used in parallel.

A masking processing circuit 212 and a UCR processing circuit 214 are constructed as follows. In the illustrative embodiment, the UCR processing circuit 214 is shown independently of the masking processing circuit 212 because four colors inclusive of black are used herein. It will be noted, however, that the processing performed by the circuits 212 and 214 is the color compensation processing which is completed as a single process and, for this reason, the circuits 212 and 214 will hereinafter be collectively referred to as a color compensating circuit.

The color compensating circuit performs the following matrix operation (color compensation processing function) for color compensation processing:

$$\begin{bmatrix} Yo \\ Mo \\ Co \\ BKo \end{bmatrix} = [Amn] \begin{bmatrix} Yi \\ Mi \\ Ci \\ Yi^2 \\ Mi_2 \\ Ci_2 \\ Yi \cdot Mi \\ Mi \cdot Ci \\ Ci \cdot Yi \\ K \end{bmatrix}$$

where Amn is a color compensation processing coefficient (m=1 to 4, n=1 to 10), Yi, Mi and Ci are data before color compensation, Yo, Mo, Co and BKo are data after the compensation, and K is a constant.

In this particular embodiment, the circuits 212 and 214 (color compensating circuit) are implemented with a pair of ROMs which store data which may be addressed by outputs Y, M and C of the averaging and data compressing circuit 210 for each of three kinds of color compensation coefficients, which will be described with respect to three different situations.

First, where a color document which is produced using the apparatus in accordance with the illustrative embodiment produced by or any other apparatus having a similar color reproducible range is to be recopied, a color compensation coefficients is determined as follows. Model data Cm, Mm, Ym and BKm are applied to the output lines of the UCR circuit 214 of FIG. 7. This energizes the lasers to produce a color chart. Here, the model data are implemented with color data made up of 512 different colors. The color chart is laid on the glass platen of the apparatus to be scanned. Then, data Cm', Mm' and Ym' which have undergone the previously mentioned shading compensation, gamma compensation, complement generation and data compression (outputs of the circuit 210) are sampled. The sampled data Cm', Mm' and Ym' are substituted for the data Ci, Mi and Yi before compensation which are included in the aforementioned matrix operation, and the model data Cm, Mm, Ym and BKm for the data Yo, Mo, Co and BKo after compensation. The resultant simultaneous linear equations have unknowns for which the color compensation coefficients are solved. Where the coefficients are determined for the respective 512 different colors, they are slightly different from one another because in the matrix operation the non-linear terms are limited to the quadratic. Hence, an arithmetic mean is produced excepting any singular values in the equations so as to determine the coefficient Amn.

Second, where a photograph or a printed document having a similar color reproducible range is to be copied, the coefficient is determined as follows. As in the first situation, model data Cm, Mm, Ym and BKm associated with C, M, Y and BK, respectively are applied to the output lines of the UCR circuit 214 of FIG. 7 to prepare a color chart (512 colors). The color chart is photographed in color and the resultant photograph is laid to the glass platen of the apparatus to be scanned. Data (outputs of the circuit 210) Cm', Mm' and Ym' which have undergone the previously stated shading compensation, gamma compensation, complement generation and data compression are sampled. If the output level of the sampling data of the color photograph associated with the white level of the color chart is Spw' which is different from the output level Spw of the sampling data associated with the reproducible white level of the color photograph, a level conversion value $\alpha = Spw/Spw'$ is determined. The sampled data Cm', Mm' and Ym' are each multiplied by $\alpha$ and the products are respectively substituted for the data Ci, Mi and Yi, then the model data Cm, Mm, Ym and BKm are substituted for the data Yo, Mo, Co and BKo, and then simultaneous linear equations the unkown of which is the coefficient are solved. In this manner, coefficients are produced for all the 512 colors and, then, an arithmetic mean is produced excepting for any singular values in the equations to thereby determine the coefficient Amn.

Third, where a color TV receiver, a color video tape recorder or a color TV camera is connected to the external interface 144 to produce a color hard copy, the coefficient is determined as follows. After a color TV camera, for example, has been connected to the interface 144, model data Cm, Mm, Ym and BKm associated with C, M, Y and BK, respectively, are applied to the output lines of the UCR circuit 214 of FIG. 7 to prepare a color chart (512 colors). The color chart is read by the camera so that the data Cm', Mm' and Ym' subjected to gamma compensation, complement generation and data compression (outputs of the circuit 210) are sampled. If the output level of sampling data which are obtained by shooting the white level of the color chart is Stw' which is different from the output level Stw of sampling data of the white level of the camera, a level conversion value $\alpha = $Stw/Stw' is determined. The sampled data Cm', Mm' and Ym' are each multiplied by $\alpha$ and the products are respectively substituted for the data Ci, Mi and Yi of the matrix operation, the model data Cm, Mm, Ym and BKm for the data Yo, Mo, Co and BKo, and then simultaneous linear equations the unknown of which is the coefficient are solved. In this manner, coefficients are determined for all the 512 colors. Subsequently, an arithmetic mean of those coefficients is produced excepting singular values, thereby determining a coefficient Amn.

In the color compensating circuit (circuits 212 and 214), the ROMs store output data (Y, M, C and BK) tables for each of the above-described three different possible situations and which may be addressed by the outputs Y, M and C of the circuit 210. To select output data tables, the key switch 306 on the console board 300 is manipulated to generate a selection signal. Specifically, where the illustrated copier is used to copy a color copy, for example, the key switch 306 is manually operated to specify the output data tables which are associated with the first-mentioned situation. Where a color photograph is copied, for example, one of the key switches 306 is operated to select the output data tables which are associated with the second-mentioned situation. Further, where a color TV receiver, a color video tape recorder or a color TV camera is connected to the interface 144 to produce a color hard copy, for example, one of the key switches 306 is operated to select the output data tables which are associated with the third-mentioned situation.

Buffer memories 216y, 216m and 216c are also included in the image processing unit 200 and simply serve to generate time delays each being associated with a distance between the drums. Data are read into the memories 216y, 216m and 216c at the same timing. Concerning data readout timing, however, the memories 216y, 216m and 216c are different from each other, as shown in FIG. 10. Specifically, data readout from the memories 216y, 216m and 216c are timed to modulation of the lasers 88y, 88m and 88c, respectively. Assuming that the maximum format is A3, the capacity required of the memory 216y needs only to be at least about 24 percent of the maximum amount necessary for a document sized A3, that required of the memory 216m about 48 percent of the same, and that required of the memory 216c about 72 percent of the same. Assuming that the readout pixel density of each CCD is 400 dots per inch (15.75 dots per millimeter), about 87K bytes suffice for the memory 216y, about 174K bytes for the memory 216m, and about 261K bytes for the memory 216c. In this particular embodiment, since sixty-four tones and six-bits data are handled, the memories 216y, 216m and 216c are provided with capacities of 87K bytes, 174K bytes and 261K bytes, respectively.

A half tone processing circuit further included in the image processing unit 200 functions to process the Y, M and C half tone data with respect to two levels in order to turn on and off the laser beams. The two-level processing is implemented with a density pattern method because in this embodiment the pixel density data are compressed to 1/64. The density pattern method per ce is well known in the art and, therefore, detailed description thereof will be omitted herein. Briefly, the circuit 218 includes a ROM in which two-level patterns each being representative of sixty-four tones of each color are stored; one of the patterns is specified by the density of each color so that two-level data of the density pattern is read out address by address of pixels.

By the above-described procedure, two-level image data are generated for each of yellow, magenta and cyan and then applied to the laser drivers 86y, 86m and 86c, respectively.

In the illustrative embodiment, since two-level image data are compressed to 1/64 using a mean data of eight×eight pixels, the essential resolution is determined by the size of the eight×eight pixel matrix. For this reason, concerning two-level black data, the data selector 220 produces OR of the black separated by the circuit 208 and the black separated by the circuit 214 in order to enhance the resolution of characters and others. The output of the data selector 220 is applied to the laser driver 86bk via an OR gate 222. When the input signal to any of the laser drivers 86bk, 86y, 86m and 86c is a ZERO, it does not drive its associated laser 88bk, 88y, 88m or 88c to allow the charge in the corresponding portion of the associated drum 100bk, 100y, 100m or 100c to remain, with the result that the associated toner becomes deposited thereon. Conversely, when the input signal to the laser driver is a ONE, the laser driver drives the laser to dissipate the charge and, thereby, prevents the toner from being deposited on the drum.

In the black mode which is available for producing a monochromatic or black copy, the black separating circuit 208 and others which follow the circuit 208 are deenergized and, instead, the R, G and B signals which are branched just before the circuit 208 are routed to a peak detector 226. After the peak detector 226 has compared those three input signals to choose one of them which has the greatest value, a binarizer 228 compares the output of the peak detector 226 with a predetermined threshold value to produce binary image data which is representative of black (ZERO; recording) or white (ONE; non-recording). The output of the binarizer 228 is fed to the laser driver 86bk via the OR gate 222.

A synchronization control circuit 224 is adapted to determine energization timings of the above-described various elements so as to match the timings to each other. Designated by the reference numeral 400 is a microprocessor system for controlling all the elements of FIG. 7, i.e., the whole copier. The processor system 400 controls the various copy mode operations which may be selected through the console board 300 and controls the sequences of the drum driving system, illuminating system, charging system, developing system, fixing system and others as well as the image reading and recording system of FIG. 7.

Although three specific situations, or three kinds of inputs, have been shown and described in relation to color compensation, any other desired siutations may also be contemplated. For example, there may be set up a situation wherein the object to be copied is a color slide, and a situation wherein a color TV camera is connected to a copier to reproduce a color photograph.

While the present invention has been shown and described in relation to an electrophotographic type digital color copier, it is similarly applicable to any other type of color copier and color printer such as an electrostatic recording type using styluses, a thermal transfer type and an ink jet type.

In summary, it will be seen that in accordance with the present invention color compensation processing optimum for color video information, which is to be reprodued as a color hard copy, is performed to ensure optimum color image processing at all times.

Various modifications will become possible for those skilled in the art after receiving the teachings of the present disclosure without departing from the scope thereof.

What is claimed is:

1. A method of color correction of an inputted color image comprising:

selecting data representing a set of actual conditions under which the inputted color image was produced from prestored data representing possible conditions under which the inputted color image could have been produced;

producing by calculating color correction coefficients for various sets of conditions such that coefficients themselves on the basis of the selected data for correction of any distortions which would otherwise occur in outputting the inputted image;

correcting said inputted image in accordance with said produced coefficients; and wherein the data representing possible conditions include the kind of recording system used to produce the printed matter, kind of paper employed in the production of said printed matter, and the kind of ink employed in the production of said printed matter.

2. A method as in claim 1, wherein the inputted color image is a photograph and the prestored data representing possible conditions include the type of illumination used in creating the photograph, the type and character of film used in creating said photograph, and the type of development used in processing said film.

3. A method as in claim 1, wherein the inputted image is of printed matter;

wherein the data representing the possible conditions include, the kind of recording system used to print the printed matter, the kind of paper employed in the printing of said printed matter, and the kind of ink used in printing the printed matter; and further comprising the step of the production of data values indicative of any possible color distortion contained in the outputted image with respect to an originally inputted image, and which is further a function of three primary color separation signals, wherein said data values produced are based upon the input of the originally inputted image, with coefficients being produced so as to provide for color correction, by way of an inverse function using said calculated data values.

4. A color correction method for inputting images of a color document correction after the color distortion of the images so inputted, wherein the color distortions of said document relative to an original are given as a series of output data values, as in claim 1, wherein said data values are indicative of a data values of a function of three primary color separation signals, the correction of colors of the original being corrected by the inverse data values from said function processing using said derived data values.

5. A color correction method as claimed in claim 4, wherein both of color distortions of the document relative to the original and color distortions in a recording system for recording images associated with the document are given as data values associated with the functions of three primary color separation signals.

6. A color correction method as claimed in claim 4, wherein three primary color separation signals are entered separately as input data, the data values for the functions of the three primary color separation signals being determined by giving coefficients which allow color distortions of the inputted document relative to the original to be estimated.

* * * * *